April 22, 1930.   B. J. NELSON   1,755,455
AUTOMATIC TURNING DEVICE FOR SPRINKLING SYSTEMS
Filed Dec. 17, 1924   4 Sheets-Sheet 1
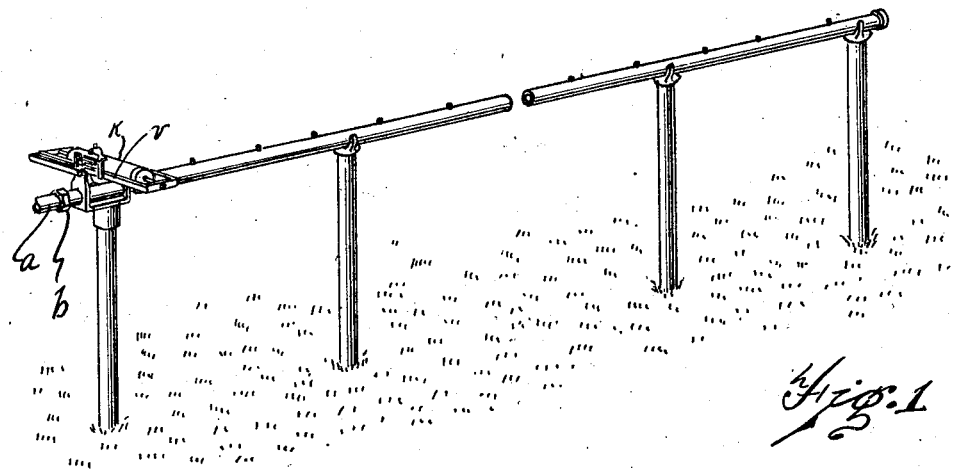
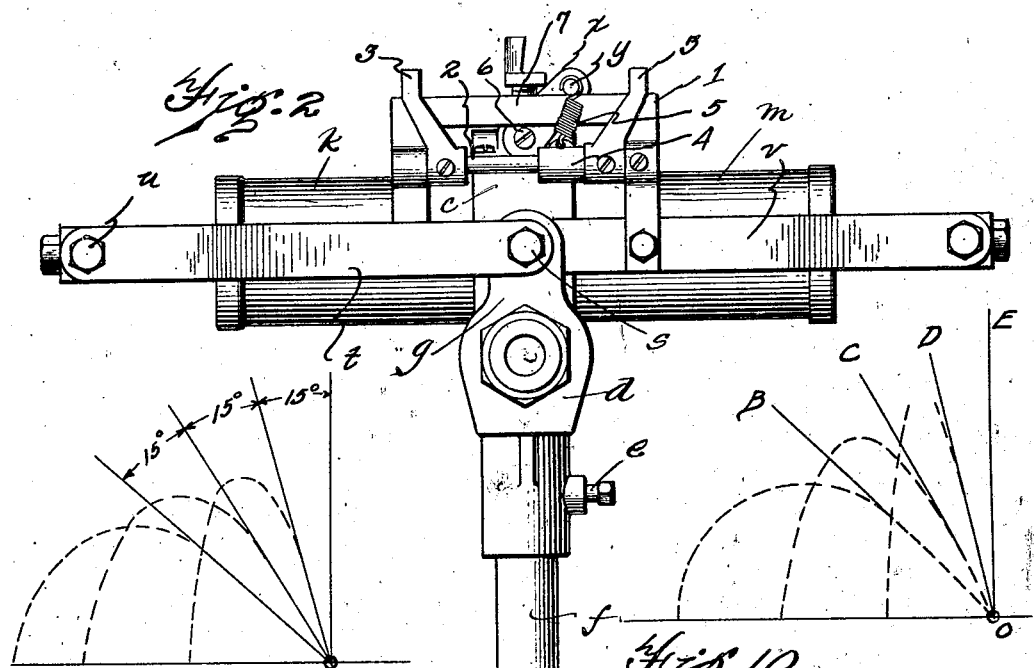
INVENTOR.
Bert J. Nelson.
BY
ATTORNEY.

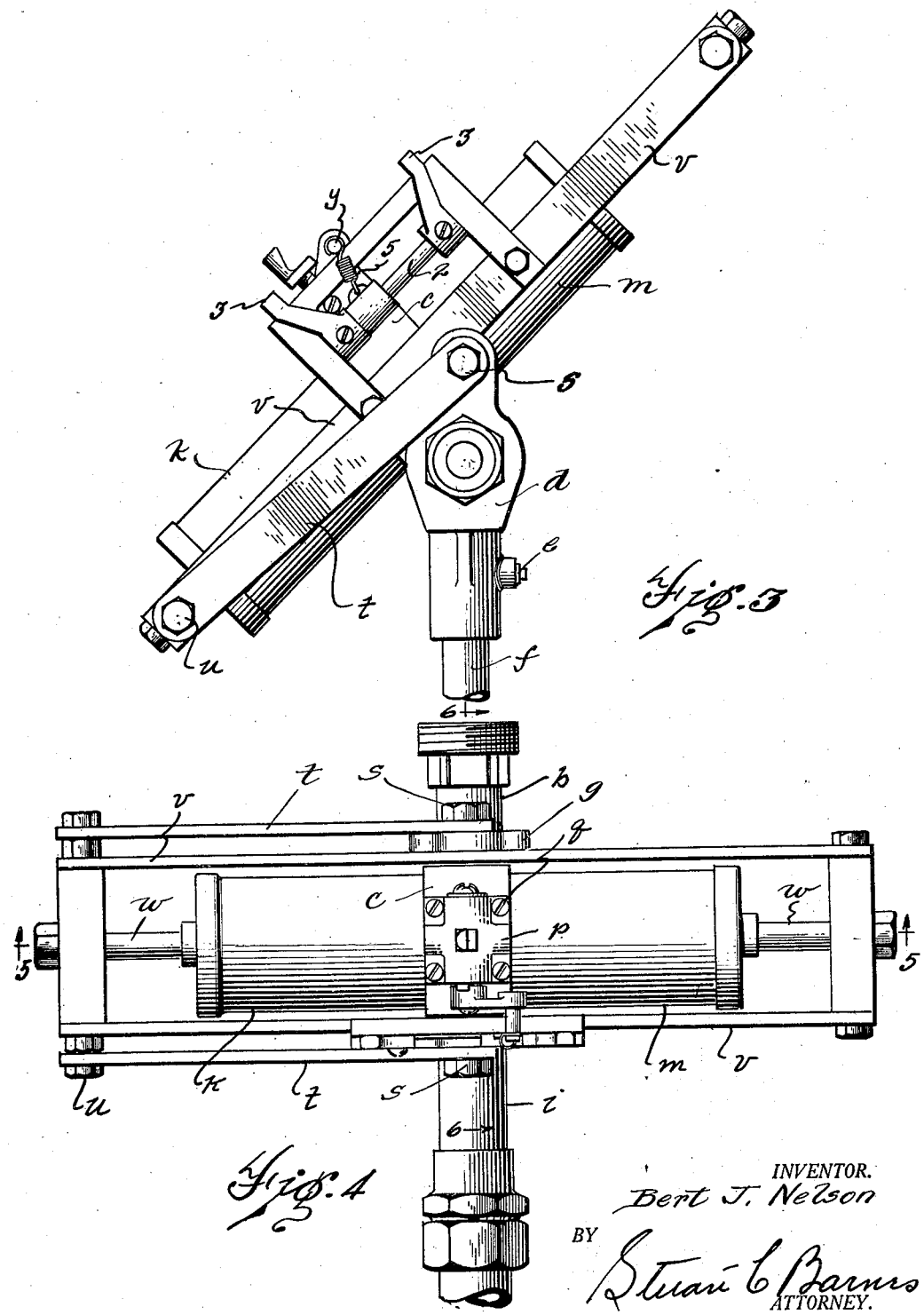

April 22, 1930.    B. J. NELSON    1,755,455
AUTOMATIC TURNING DEVICE FOR SPRINKLING SYSTEMS
Filed Dec. 17, 1924    4 Sheets-Sheet 3
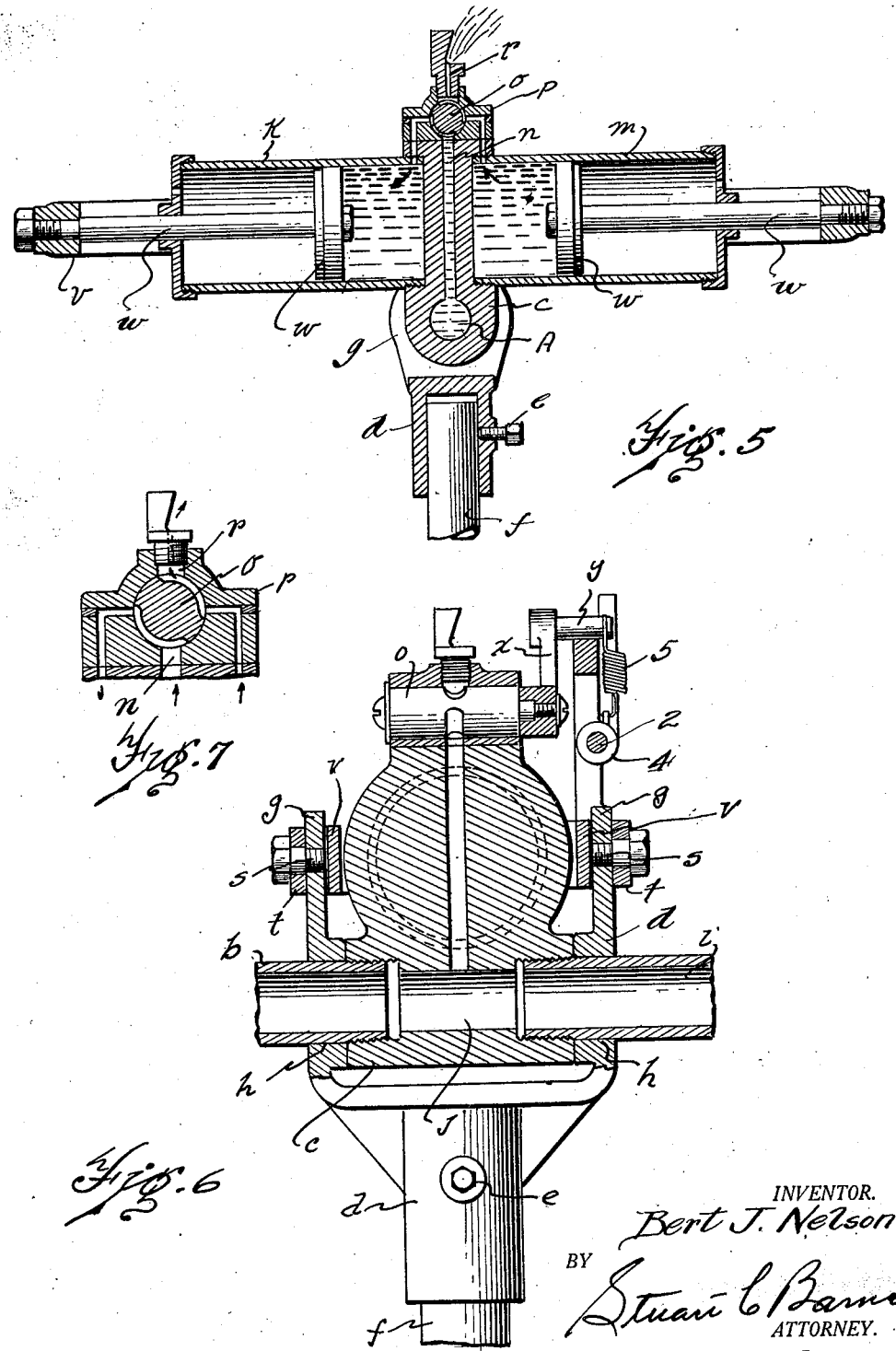
INVENTOR.
Bert J. Nelson.
BY
ATTORNEY.

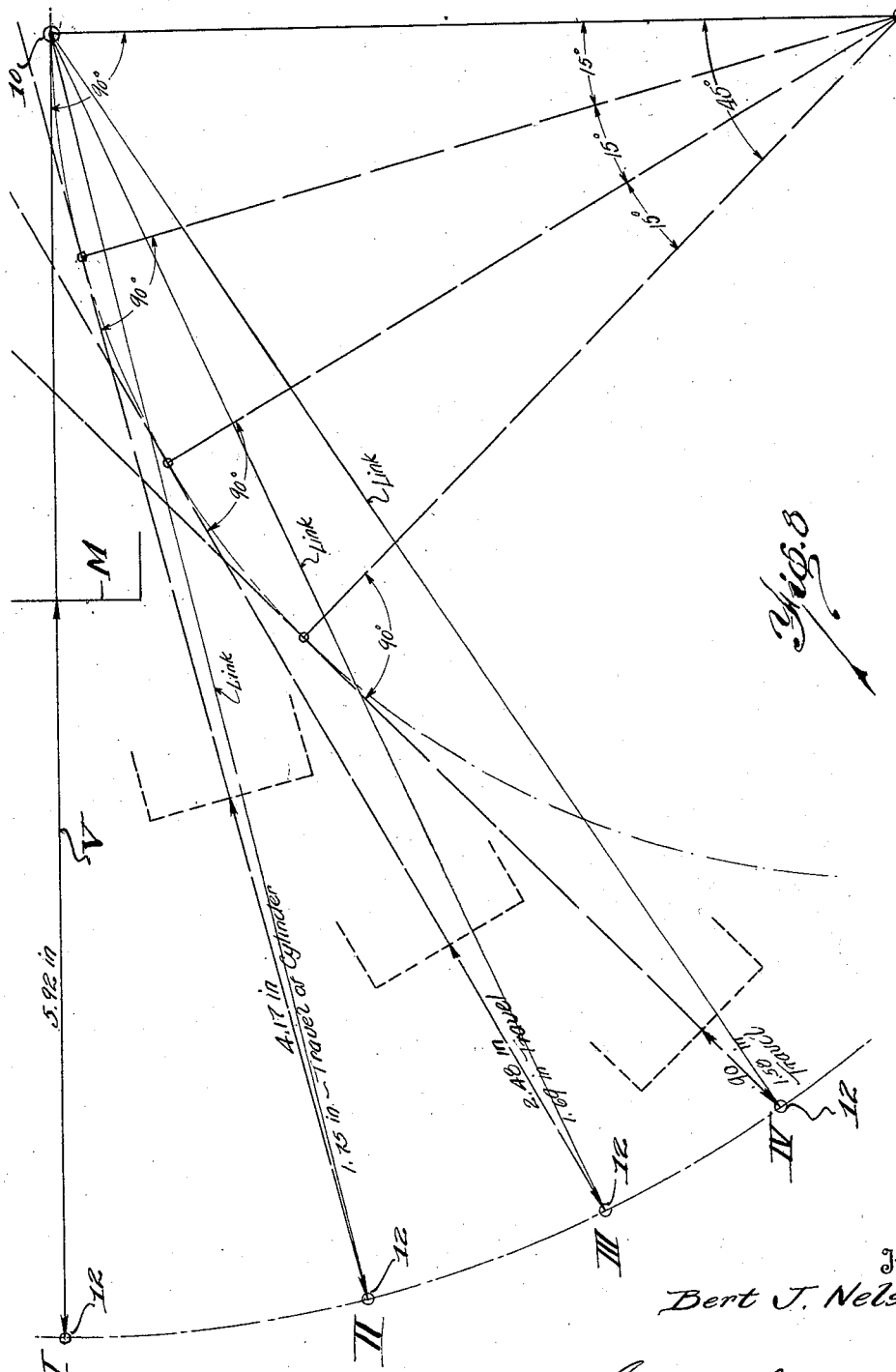

Patented Apr. 22, 1930

1,755,455

UNITED STATES PATENT OFFICE

BERT J. NELSON, OF DETROIT, MICHIGAN, ASSIGNOR TO WHITE SHOWERS, INC., OF DETROIT, MICHIGAN, A CORPORATION OF MICHIGAN

AUTOMATIC TURNING DEVICE FOR SPRINKLING SYSTEMS

Application filed December 17, 1924. Serial No. 756,394.

This invention relates to a fluid pressure motor, more particularly one which is specially adapted for the purpose of distributing the water spray of an overhead irrigation system uniformly over the ground.

One of the objects of the invention is a provision of a fluid pressure motor in which a portion of the pressure fluid serves to actuate the motor. The construction of the motor is such that same oscillates at a variable speed, a result which is well adapted for an overhead irrigation system, in which the spray pipe or conduit is oscillated to direct the water spray over a large area of ground. In order to obtain a uniform distribution of the water over the ground it is necessary to oscillate the spray conduit at a variable speed, that is to increase the velocity of oscillation as the motor reaches the limit of its movement, at which time the water spray is directed to the furthermost portion of the ground that is to be irrigated. The reason for this will be obvious as the following description will explain the problem more in detail and the means for solving the problem.

Another object of the invention is to provide means for reversing the movement of the motor, such means arranged to have a quick snappy action. This reversing of the motor is controlled through means actuated by the movement of the motor and may be so adjusted as to reverse the motor at any desired point for controlling the area of ground which is desired to be irrigated.

In the drawings:

Fig. 1 is a perspective view of a portion of an overhead irrigation system with my oscillating motor assembled therein.

Fig. 2 is an elevation of my motor showing the same in a horizontal position wherein the streams of water are directed substantially vertical.

Fig. 3 is an elevation of my motor tipped to the extreme movement in which it is oscillated.

Fig. 4 is a plan-view thereof.

Fig. 5 is a vertical sectional view taken on the line 5—5 of Fig. 4.

Fig. 6 is a transverse sectional view taken on the line 6—6 of Fig. 4.

Fig. 7 is an enlarged sectional view through the valve.

Fig. 8 is a diagrammatic view showing the motor in different positions. The purpose of this view is to pictorially describe the action of the motor to show how the same oscillates at variable speeds.

Fig. 9 is a diagrammatic view of the spraying action with equal degrees of oscillation.

Fig. 10 is a diagrammatic view of the spraying action showing how an equal distribution of the water is obtained with my variable speed oscillating motor.

A supply pipe $a$ which may be connected to a suitable water main is attached to a coupling $b$ which is in turn connected to the central casting $c$. A bracket $d$ is secured as at $e$ to a standard $f$. This forms a rigid support for the motor. This bracket $d$ is provided with upstanding arms $g$ provided with the holes $h$ which are in alignment. The casting $c$ is positioned between these upstanding arms $g$ and the coupling part $b$ is passed through the hole $h$ in one of the arms and secured to the casting. A spray pipe $i$ is passed through the hole $h$ in the other arm $g$ and also secured to the casting, and the casting is provided with a passageway $j$ therethrough which places the spray pipe $i$ in communication with the supply pipe $a$. Thus the pipe $i$ and the part $b$ serve to rotatably support the casting on the rigid bracket.

The cylinders $k$ and $m$ are each secured on one side of the casting as clearly shown in Fig. 5. A passageway $n$ communicates with the passageway $j$ and extetnds up through the central portion of the casting and a valve $o$ is rotatably supported in the valve housing $p$ which is secured to the top of the casting $c$ by the screws $q$. It will be noticed in Fig.

5 that the valve is positioned so as to place the cylinder $k$ in communication with the passageway $n$, thereby allowing the water under pressure to flow into the cylinder $k$ in the direction of the arrow while the water in the cylinder $k$ is allowed to exhaust through the exhaust port $r$. I prefer to secure a nozzle into this exhaust port so as to utilize this water that is exhausted from the motor as a spray.

It will be obvious from observing Figs. 5 and 6 that the casting $c$ which carries the cylinders $k$ and $m$ is hinged to the support or bracket $d$ so as to rotate about the center A (Fig. 5) and 11 (Fig. 8). The arms $g$ have hinged thereto as at $s$ the links $t$. The other end of these links are hinged as at $u$ to a frame $v$. Secured to this frame are a pair of pistons $w$ which are extended inwardly and arranged to operate in the opposed cylinders $k$ and $m$.

In the operation of the motor the water is forced into one of the cylinders, and as shown in Fig. 5, it is being forced into the cylinder $k$. This would tend to force the piston operating in cylinder $k$ outwardly, but as the piston is secured to the frame $v$ which is in turn hinged to the rigid support through the link, the piston does not reciprocate but the cylinder is forced to the right and since the cylinder which is secured to the casting $c$ is pivoted or hinged to the support at A it causes the cylinder to rotate about this center in a clockwise direction. Obviously this relative movement between the frame and cylinder can only take place by tipping the entire apparatus as shown in Fig. 3. Obviously when the water under pressure is conducted into the cylinder $m$ the entire apparatus is tipped in the opposite direction.

I have provided an automatic control whereby the fluid under pressure may be conducted first into one cylinder and then into another for imparting an oscillating movement to the apparatus. A valve arm $x$ is secured to the end of the valve $o$ and is provided with the laterally extending pin $y$. Supported on the frame $v$ is a bracket 1 which supports the rod 2. Adjustably secured on this rod are a pair of cam arms 3, the said adjustment permitting these arms to be secured at any point along the rod 2. Slidably supported by the rod 2 in between the arms 3 is a slide 4 to which is secured one end of the tractile spring 5, the other end of the spring being secured to the pin $y$ carried by the valve arm. Due to the fact that the frame $v$ rocks on a different center than the casting $c$ it is obvious that there is relative movement between the pin $y$ carried by the valve supported in the casting and the arms 3 which are supported by the frame. Referring to Figs. 2 and 3 we will assume that the apparatus is moving in a clockwise direction. The pin $y$ travels at a greater relative speed than the arm 3, and therefore as the apparatus continues to move the arm 3 will engage the pin $y$ and tend to throw or move the valve arm $x$ in a counter clockwise direction. At this moment the pivot or center about which the arm $x$ rotates which is designated 6 is thrown past the center line drawn through the pin $y$ and a point where the spring 5 is secured to the slide 4. This will result in the spring imparting a quick movement to the valve arm and throw the same in a counter clockwise direction, the pin $y$ then striking the bridge 7 carried by the bracket 1 which limits the travel of the valve arm. This will reverse the position of the valve from that shown in Fig. 5. This action will immediately cause the water under pressure to flow into the cylinder $m$ and allow the water in cylinder $k$ to exhaust. This will reverse the movement of the entire apparatus with a quick snappy action as the snap-over control of the valve is operated almost instantaneously. In Fig. 3 this snap-over control is shown just after the pin $y$ has engaged the cam arm 3 whereupon the spring has moved the valve arm to the right.

In Fig. 8 I have shown a diagrammatic view in which I desire to pictorially represent the variable speed action of the motor. The fluid under pressure is allowed to flow into either of the cylinders at a constant rate, thereby moving the cylinder with respect to the frame at a constant rate of speed. The diagrammatic figure is drawn very accurately in which the solid line V represents the frame which is pivoted or hinged to the support as at 10 by means of the links above described. The cylinder M is pivoted or rotatably supported by the support at 11. The cylinder and frame are so connected through the piston that the frame is parallel with the cylinder at all times and any oscillating movement imparted to the cylinder will be directly transmitted to the frame.

We will now assume that the fluid under pressure is forced into the cylinder and moves the same until it has moved the apparatus through an arc of 15 degrees. The parts will now assume the position shown by position II. The first position as described is designated I wherein the cylinder and frame are positioned at the middle point of their movement and are positioned horizontally. The link $t$ is hinged at the point 10 to the support and at the point 12 to the frame V. The distance between the cylinder M and the point 12 or the end of the frame is scaled to be 5.92 inches when in position I. After the apparatus is moved through an arc of 15 degrees, it assumes the position shown in II. The distance between the cylinder and 12 is now scaled to be 4.17 inches, and obviously the cylinder has travelled 1.75 inches. Now, assuming that the apparatus is moved through an arc of 15 more degrees, it will assume the position as shown in III. The cylinder is now found to have travelled further to the left and the distance between the end of the cylinder and the point 12 is scaled to be 2.48 inches and the cylinder in travelling from the II position to the III position has travelled 1.69 inches. Similarly the cylinder travels from III position to IV position through another arc of 15 degrees and travels 1.58 inches. From the above it will be noticed that for equal amounts or degrees of oscillation the cylinder travels a smaller number of inches with respect to the frame for every 15 degrees of movement as same approaches the extreme tilted position, at which time the valve is reversed and the movement of the apparatus is reversed.

One of the given conditions of this problem is that the cylinder reciprocates at a constant rate of speed with respect to the frame. Therefore, for example, if it takes one second to travel from the first position to the second position, in the next second the cylinder must travel the same distance or 1.75 inches, but it is shown that the apparatus in moving through the second arc of 15 degrees does not travel 1.75 inches but travels only 1.69 inches. Therefore, if the cylinder is to travel 1.75 inches in the next unit of time it must move the apparatus further, or an arc of more than 15 degrees. Similarly, the speed is increased during the last 15 degrees of travel, as from the drawing it is quite obvious that this movement must increase in speed to allow the cylinder to cover the same distance per unit of time. With this explanation I believe that the action of the motor, which provides a variable speed of oscillation, can be plainly understood.

The reason for a change in a speed in oscillation of the motor is because during each unit of time it is desired to distribute the same quantity of water on an equal area of ground. In Fig. 9, we show in dotted lines the direction of the spray for each 15 degrees of oscillation. It will be seen for each 15 degrees that the spray gradually reaches a point further from the center 20, but these distances gradually decrease as the angle of the spray changes from the vertical to the 45 degrees which is preferred to be the limit of travel of the oscillating apparatus. Now, to enable the device to spray an equal area of ground per unit of time it is desirable to increase the speed of oscillation near the limit of travel. The means whereby I have provided this variable speed motor for oscillating the spray pipe enables me to equalize the water distribution over the ground and the sprays are directed as shown in Fig. 10 for each unit of time. Angle BOC is greater than COD which is in turn greater than DOE. A variable speed in the oscillating motion of the motor enables me to obtain this equal distribution of water as the motor oscillates through each of these angles in the same unit of time. Obviously, my invention has very broad aspects, and I desire to cover in my claims means for providing the variable speed for the above apparatus, as obviously other forms of motive power could be used which would be the full equivalent of my broad invention.

What I claim is:

1. In a liquid distributing system, the combination of a fluid pressure oscillating motor, a spray conduit connected to an oscillating part of said motor, the axis of movement of said spray conduit being in line with the pivot point of said oscillating part, a conduit for supplying liquid to said spray conduit, means for directing part of said liquid to said motor for operating the same to oscillate said conduit, a plurality of adjustable means for independently controlling the flow of liquid to and the actuation of said motor to control the amplitude of said oscillating motion, and means pivotally connected to an oscillating part of said motor and having its fulcrum at a different point than said first named pivot for varying the speed of oscillation of said conduit during each stroke.

2. In a liquid distributing system, the combination of a fluid pressure oscillating motor, a support, said motor comprising one member hinged to said support and having an oscillating motion, a second member hinged to said support at a point below said first member and having an oscillating motion and a reciprocating motion with respect to the first member, a spray conduit directly connected to one of said members and means for imparting a reciprocating motion to said second-mentioned member, whereby both members are caused to oscillate for the purpose of oscillating said spray conduit.

3. In a liquid distributing system, the combination of a support, and a fluid pressure oscillating motor having a spray conduit connected thereto and comprising one member consisting of a pair of opposed cylinders and which is hinged to said support, a second member provided with pistons operating in said opposed cylinders and which is also hinged to said support at a point below said first member, said spray conduit directly connected to said first mentioned member, and means for conducting a fluid under pressure first to one cylinder and then to the other cylinder to impart a reciprocating motion to the first member with respect to the second member whereby both members and the spray conduit are caused to oscillate.

4. In a liquid distributing system, the combination of a support, and a fluid pressure oscillating motor having a spray conduit connected thereto and comprising one member which consists of a pair of opposed cylinders and which is hinged to said support, a second member provided with pistons operating in said opposed cylinders and which is hinged to said support, said spray conduit directly connected to said first mentioned member, a valve for controlling the flow of liquid under pressure to said cylinders, and means for actuating said valve by a quick snappy action to cause the fluid to enter first one cylinder and then the other cylinder for the purpose of imparting a reciprocating motion to said first member with respect to the second member whereby the motor and spray conduit are caused to oscillate.

5. In a liquid distributing system the combination of a fluid pressure oscillating motor, a support, said motor comprising one member hinged to the support and provided with a pair of opposed cylinders, and a second member also hinged to the support and provided with pistons stationary relative to each other, fluid pressure supply means for operating the motor, and a valve for controlling the flow of fluid to direct the fluid first into one cylinder and then into the other to reciprocate the first member with respect to the second member for oscillating the motor and independently adjustable means for actuating said valve.

6. In a liquid distributing system, the combination of a fluid pressure variable speed oscillating motor, a support, said motor comprising one member hinged to the support and provided with a pair of opposed cylinders, and a second member also hinged to the support and provided with pistons rigidly secured thereto operating in the cylinders for slidably supporting the first member with respect to the second member, said two members being hinged to said support at different points, fluid pressure supply means for actuating the motor, a quick-acting valve for directing the fluid first into one cylinder and then into the other cylinder to reciprocate the first member with respect to the second member, and adjustable means for controlling the actuation to said valve for limiting the oscillating travel of said motor.

7. In a liquid distributing system, the combination of a fluid pressure oscillating motor, a pipe connected rigidly with said motor, said pipe being adapted to supply liquid to the distributing system, means for directing part of said liquid to said motor for operating same and means for actuating and oscillating the motor including adjustable means for varying the stroke of the motor and amplitude of oscillation.

8. In a liquid distributing system, the combination of a casting secured in the length of and forming a part of the distributing pipe, cylinders secured end to end in to said casting to form an integral unit, pistons in said cylinders, means for conducting part of the liquid from the distributing pipe intermittently to each cylinder to cause oscillation of the motor and adjustable means for independently controlling the stroke of each piston.

9. In a liquid distributing system, the combination of a fluid pressure motor having an oscillating member, a spray conduit rigidly secured to said member whereby it will be oscillated in unison therewith, and a nozzle positioned on said motor for spraying the liquid used for operating the motor.

10. In a liquid distributing system, the combination of a spray conduit and a motor having an oscillating part rigidly secured to said conduit, said motor having cylinders stationary relative to each other, independent pistons stationary relative to each other, said motor being also operated by the pressure of the spraying liquid and a plurality of independently adjustable means for automatically controlling the subjecting of the motor to the pressure of the spraying liquid.

11. In a liquid distributing system, the combination of a fluid pressure motor having an oscillating member, a spray conduit directly connected to said oscillating member, means for actuating the motor to oscillate said spray conduit, and means for increasing the speed of oscillation of said conduit toward the end of each stroke independently of the arc of oscillation.

12. In a liquid distributing system, the combination of a fluid pressure motor having a plurality of pivoted oscillating parts, a spray conduit secured to one of said parts and operating in unison therewith, and fluid pressure supply means for actuating the motor, the part of the motor secured to the spray conduit being pivoted at the lowest point whereby to increase the speed of oscillation of the spray conduit towards the end of each stroke.

13. In a liquid distributing system, the combination of a fluid pressure motor of the oscillating type, a spray member secured to an oscillating part of said motor and movable in unison therewith, said motor comprising in part of a central head and a pair of opposed cylinders secured to said head, a pair of pistons working in said cylinders, water supplying means, means for directing water from said supply means alternately to each cylinder to cause oscillation of the spray conduit, and a nozzle positioned on said central head and adapted to spray the water used for operating the motor.

14. In a liquid distributing system, the combination of a fluid pressure motor having an oscillating member, a spray conduit rigidly secured to said member whereby it will be oscillated in unison therewith, a nozzle positioned on said member for spraying the liquid used for operating the motor, and a valved outlet for controlling the exhausting of the water from the motor to the nozzle.

15. In a liquid distributing system, the combination of a fluid pressure motor having an oscillating member, a spray conduit connected thereto, water supply means, means for directing a part of said water to the motor for actuating the same, a nozzle positioned on said motor for spraying the liquid used for operating the motor, and adjustable means for controlling the exhausting of the water used in operating the motor and the actuation of said motor.

In testimony whereof I have affixed my signature.

BERT J. NELSON.